United States Patent
Ishige (10) Patent No.: US 8,960,045 B2
(45) Date of Patent: Feb. 24, 2015

(54) STEERING DEVICE

(71) Applicant: Showa Corporation, Gyoda-shi (JP)

(72) Inventor: Shingo Ishige, Haga-gun (JP)

(73) Assignee: Showa Corporation, Gyoda-Shi (JP)

( * ) Notice: Subject to any disclaimer, the term of this patent is extended or adjusted under 35 U.S.C. 154(b) by 0 days.

(21) Appl. No.: 14/037,685

(22) Filed: Sep. 26, 2013

(65) Prior Publication Data

US 2014/0290422 A1 Oct. 2, 2014

(30) Foreign Application Priority Data

Mar. 28, 2013 (JP) ................. 2013-070579

(51) Int. Cl.
*B62D 1/16* (2006.01)
(52) U.S. Cl.
CPC ...................... *B62D 1/16* (2013.01)
USPC .............. 74/492; 280/775; 280/777; 280/779
(58) Field of Classification Search
USPC .............................. 280/775, 777, 779; 74/492
See application file for complete search history.

(56) References Cited

U.S. PATENT DOCUMENTS

| | | | |
|---|---|---|---|
| 7,490,855 B2 * | 2/2009 | Inayoshi et al. | 280/777 |
| 7,506,893 B2 * | 3/2009 | Higashino et al. | 280/776 |
| 8,616,580 B2 * | 12/2013 | Maniwa et al. | 280/779 |
| 2001/0019205 A1 * | 9/2001 | Ikeda et al. | 280/775 |
| 2003/0222448 A1 * | 12/2003 | Arihara | 280/775 |
| 2007/0126222 A1 * | 6/2007 | Koya et al. | 280/775 |
| 2007/0295549 A1 * | 12/2007 | Yoshioka et al. | 180/271 |
| 2011/0163525 A1 * | 7/2011 | Aoki | 280/779 |
| 2011/0227323 A1 * | 9/2011 | Osuka et al. | 280/779 |
| 2011/0241327 A1 * | 10/2011 | Montboeuf et al. | 280/775 |
| 2012/0248752 A1 * | 10/2012 | Maniwa et al. | 280/779 |

FOREIGN PATENT DOCUMENTS

JP 2005-028979 A 2/2005

* cited by examiner

*Primary Examiner* — Toan To
(74) *Attorney, Agent, or Firm* — Leason Ellis LLP

(57) ABSTRACT

A steering device includes: a steering shaft; an outer pipe; a first bearing that causes the steering shaft to be rotatable with respect to the outer pipe; and a front body that is disposed in front of the bearing in an axial direction, and the steering shaft; in which a first space into which the steering shaft is capable of being inserted is formed on a radially inner side of the front body, and a second space into which the outer pipe is capable of being inserted is formed on a radially outer side of the front body, and the steering device further includes a release mechanism that releases a relative restraint between the first bearing, a first front end portion, and a second front end portion in the axial direction in a case where the first bearing collides with the front body during the secondary collision.

4 Claims, 8 Drawing Sheets

FIG. 3
<DURING SECONDARY COLLISION>

STEERING DEVICE

CROSS-REFERENCE TO RELATED APPLICATIONS

This application is based on and claims priority under 35 U.S.C. 119 from Japanese Patent Application No. 2013-070579 filed on Mar. 28, 2013, the entire content of which is incorporated herein by reference.

BACKGROUND

1. Technical Field

The present invention relates to a steering device.

2. Related Art

After a forward collision (primary collision) of a vehicle occurs, a secondary collision occurs where a driver collides with a steering wheel. A configuration in which the steering wheel and a steering shaft move forward during the secondary collision is known in order to reduce an impact load from the steering wheel to the driver in the secondary collision (refer to JP-A-2005-28979).

In general, the steering shaft is rotatably supported by an outer pipe on an outer side thereof via a bearing. During the secondary collision, the steering shaft, the outer pipe, and the bearing move forward in an integrated manner.

SUMMARY OF INVENTION

On a front side of the bearing described above, for example, a torque sensor (front body) is disposed. In this case, during a secondary collision, a steering shaft, an outer pipe, and the bearing can move only until the bearing collides with the torque sensor, and thus there is a concern that the amount of movement (amount of stroke) for absorbing the impact decreases. Herein, the front body includes a component such as the torque sensor, and a member that is integrated with or separated from a housing and the like.

An object of the present invention is to provide a steering device in which the amount of movement of a steering shaft during a secondary collision is large.

According to an aspect of the present invention, there is provided a steering device that includes a tubular steering shaft to which a steering wheel is fixed at a rear end side thereof, and which extends in a front-rear direction, a tubular outer pipe disposed coaxially with and on an outer side of the steering shaft, a bearing which fits over a first front end portion of the steering shaft, fits into a second front end portion of the outer pipe, and causes the steering shaft to be rotatable with respect to the outer pipe, and a front body disposed in front of the bearing in an axial direction, in which the steering shaft, the outer pipe, and the bearing move forward in an integrated manner when a secondary collision occurs, a first space into which the steering shaft is capable of being inserted is formed on a radially inner side of the front body, a second space into which the outer pipe is capable of being inserted is formed on a radially outer side of the front body, and the steering device further including a release mechanism which releases a relative restraint between the bearing, the first front end portion, and the second front end portion in the axial direction in a case where the bearing collides with the front body during the secondary collision.

According to such a configuration, in the case where the bearing collides with the front body during the secondary collision, the release mechanism releases the relative restraint between the bearing and the first front end portion in the axial direction, and the relative restraint between the bearing and the second front end portion in the axial direction.

The first front end portion of the steering shaft is inserted into the first space that is formed on the radially inner side of the front body. Also, the second front end portion of the outer pipe is inserted into the second space that is formed on the radially outer side of the front body.

In this manner, the steering shaft and the outer pipe, whose restraint between themselves and the bearing in the axial direction is released by the release mechanism, move further forward, and thus the amount of movement of the steering shaft increases.

The steering device may have a configuration in which the release mechanism include a plurality of first slits formed at the first front end portion, arranged in a circumferential direction, and extending in the axial direction, and a plurality of second slits formed at the second front end portion, arranged in the circumferential direction, and extending in the axial direction.

According to such a configuration, the release mechanism can be configured with ease by the plurality of first slits formed at the first front end portion, arranged in the circumferential direction, and extending in the axial direction, and the plurality of second slits formed at the second front end portion, arranged in the circumferential direction, and extending in the axial direction.

The steering device may have a configuration in which the release mechanism further include a first stepped surface structure including a first pressure surface of the steering shaft over which the bearing fits and to which the bearing press-contacts in a normal state, and a small-diameter surface formed to have a diameter smaller than a diameter of the first pressure surface on a rear side of the first pressure surface, and a second stepped surface structure including a second pressure surface of the outer pipe into which the bearing fits and to which the bearing press-contacts in the normal state, and a large-diameter surface formed to have a diameter larger than a diameter of the second pressure surface on a rear side of the second pressure surface.

According to such a configuration, the release mechanism can be configured with ease by the first stepped surface structure including the first pressure surface and the small-diameter surface, and the second stepped surface structure including the second pressure surface and the large-diameter surface.

According to any one of the configurations, it is possible to provide the steering device in which the amount of movement of the steering shaft during the secondary collision is large.

DESCRIPTION OF EMBODIMENTS

An embodiment of the present invention will be described referring to FIGS. 1 to 6.

Configuration of Steering Device

A steering device 1 is, for example, a column assist type electric power steering device.

The steering device 1 includes a steering shaft 10 (upper shaft), an outer pipe 20, a first bearing 30, a second bearing 40, an input shaft 51, a torque sensor (front body), and a housing 71.

Steering Shaft

The steering shaft 10 is a cylindrical shaft that extends in a front-rear direction, and a steering wheel (not illustrated) is fixed to a rear end side thereof. The steering wheel is a wheel that is operated by a driver. The steering shaft 10 is longer than the outer pipe 20, and a rear end side thereof projects from the outer pipe 20.

First Front End Portion and First Slit of Steering Shaft

Figure 5:
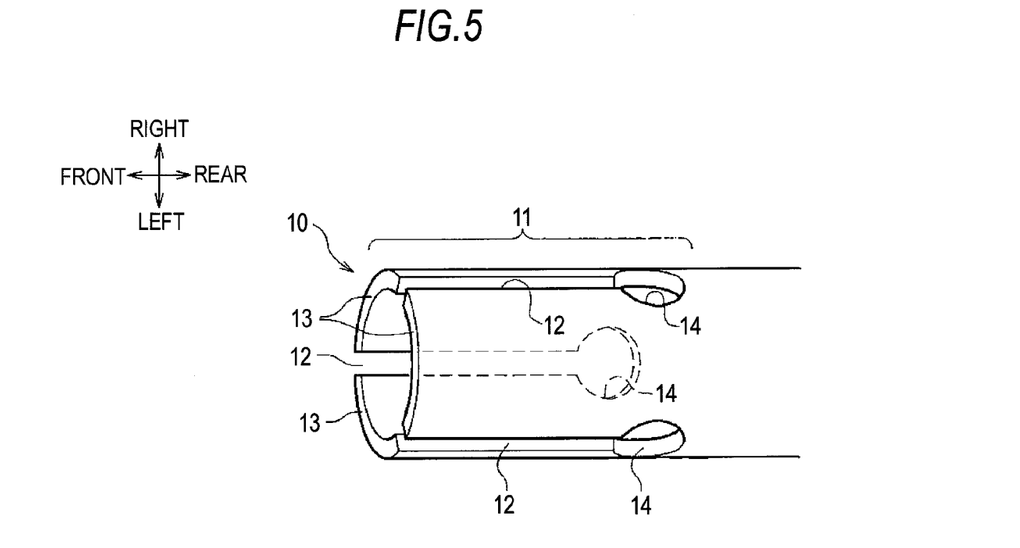
FIG. 5 is a perspective view illustrating slits according to the embodiment.

The steering shaft 10 has a first front end portion 11 over which a first bearing 30 fits at a front end side thereof. In other words, the steering shaft 10 has the first front end portion 11 that fits into the first bearing 30 (refer to FIG. 2). As illustrated in FIG. 5, three first slits 12 that have open front sides and extend toward a rear side along an axial direction are formed at the first front end portion 11. The first front end portion 11 is incompletely split into three split pieces 13 that have a shape of a cylinder which is divided into three equal parts in a circumferential direction. The length of each first slit 12 is set to be equal to or longer than the length of the first bearing 30 in the axial direction.

Figure 7:
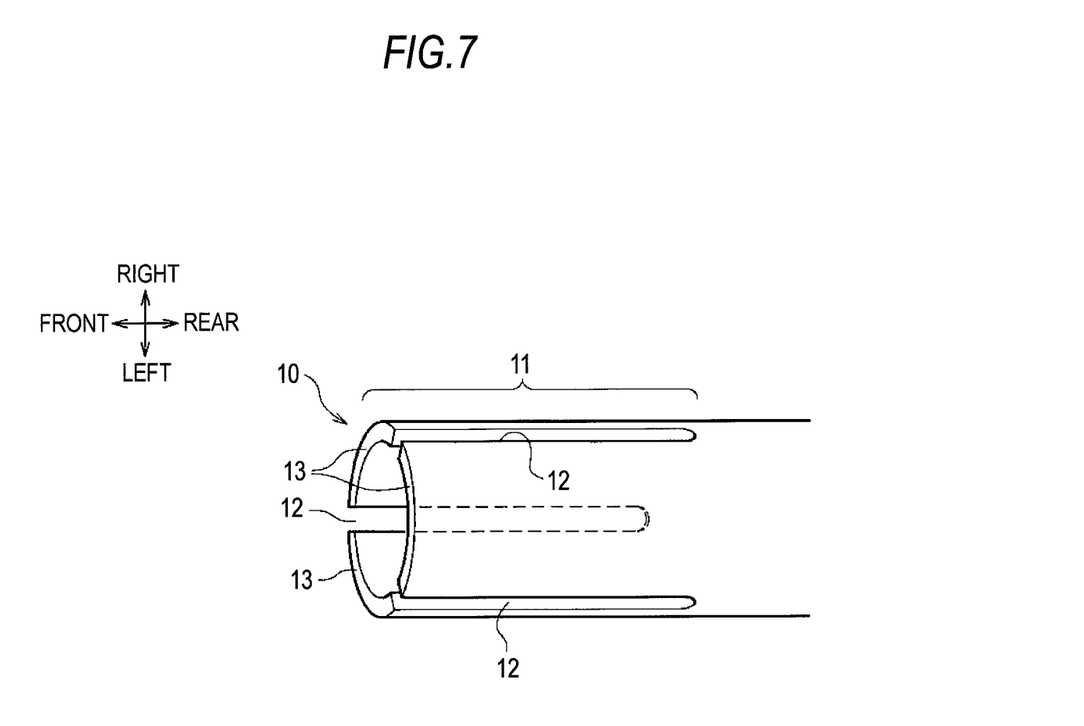
FIG. 7 is a perspective view illustrating slits according to a modification example.

The three first slits 12 are arranged at regular intervals (intervals of 120°) in the circumferential direction. However, the number of the first slits 12 may be one or more than three. Also, on a rearmost side of each first slit 12, a through-hole 14 whose diameter is larger than the width of the slit is formed, and thus each split piece 13 bends with ease toward a radially inner side when a secondary collision occurs. However, the configuration may not include the through-hole 14 (refer to FIG. 7).

As will be described later, in a case where the first bearing 30 collides with one or both of a magnet 61 and a clip 62 during the secondary collision, the impact causes the three split pieces 13 to bend toward the radially inner side, and a relative restraint between the first front end portion 11 and the first bearing 30 in the axial direction is released. In other words, a release mechanism is configured to release the relative restraint between the first front end portion 11 and the first bearing 30 in the axial direction by using the three first slits 12.

Outer Pipe

The outer pipe 20 is a pipe that is disposed coaxially with and on a radially outer side of the steering shaft 10. The outer pipe supports the steering shaft 10 in a rotatable manner via the first bearing 30 and the second bearing 40.

Second Front End Portion and Second Slit of Outer Pipe

Figure 6:
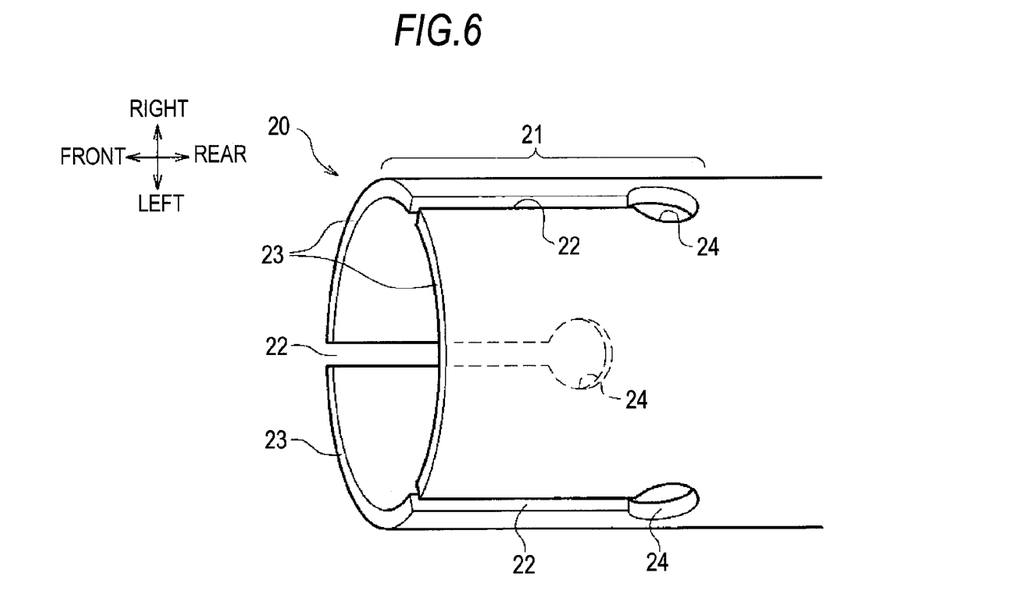
FIG. 6 is a perspective view illustrating slits according to the embodiment.

As is the case with the steering shaft 10, the outer pipe 20 has a second front end portion 21 that fits over the first bearing 30 at a front end side thereof. In other words, the outer pipe has the second front end portion 21 into which the first bearing 30 fits. As illustrated in FIG. 6, three second slits 22 that have open front sides and extend toward the rear side along the axial direction are formed at the second front end portion 21. The second front end portion 21 is incompletely split into three split pieces 23 that have a shape of a cylinder which is divided into three equal parts in a circumferential direction. The length of each second slit 22 is set to be equal to or longer than the length of the first bearing 30 in the axial direction.

The three second slits 22 are arranged at regular intervals (intervals of 120°) in the circumferential direction. However, the number of the second slits 22 may be one or more than three. Also, on a rearmost side of each second slit 22, a through-hole 24 whose diameter is larger than the width of the slit is formed, and thus each split piece 23 bends with ease toward the radially outer side when the secondary collision occurs. However, the configuration may not include the through-hole 24.

As will be described later, in the case where the first bearing 30 collides with one or both of the magnet 61 and the clip 62 during the secondary collision, the impact causes the three split pieces 23 to bend toward the radially outer side, and a relative restraint between the second front end portion 21 and the first bearing 30 in the axial direction is released. In other words, a release mechanism is configured to release the relative restraint between the second front end portion 21 and the first bearing 30 in the axial direction by using the three second slits 22.

First Bearing and Second Bearing

The first bearing 30 and the second bearing 40 are configured of, for example, radial ball bearings, and are disposed between the steering shaft 10 and the outer pipe 20 to support the steering shaft 10 in the radial direction and cause the steering shaft 10 to be rotatable with respect to the outer pipe 20 that does not rotate.

Figure 2:
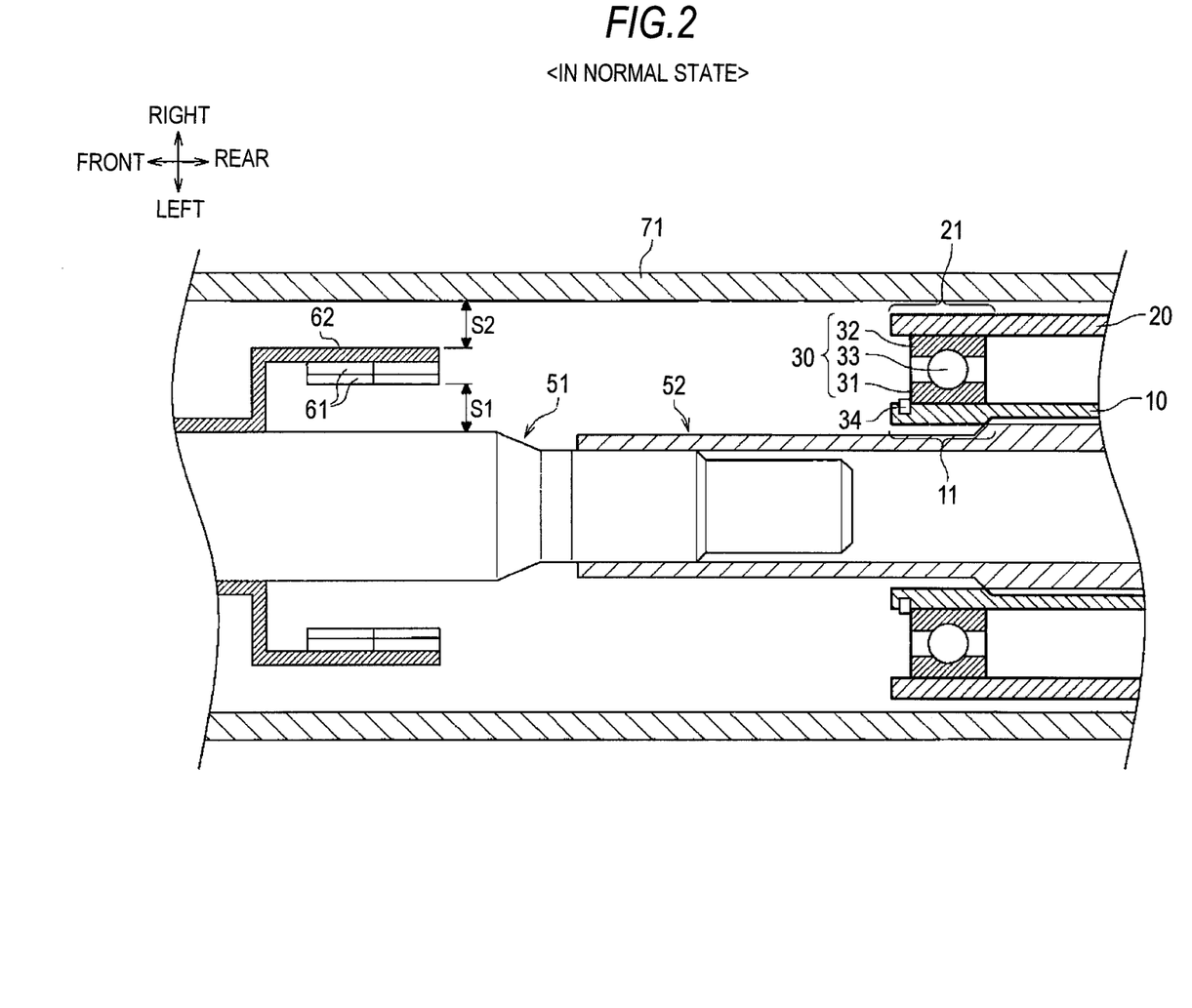
FIG. 2 is an enlarged planar cross-sectional view illustrating the steering device according to the embodiment in the normal state.

Specifically, as illustrated in FIG. 2, the first bearing 30 includes an inner ring 31 that press-fits and outwardly fits over the first front end portion 11 of the steering shaft 10, an outer ring 32 that press-fits and fits into the second front end portion 21 of the outer pipe 20, and a ball 33 that rolls between the inner ring 31 and the outer ring 32. A retaining ring 34 is attached to a front side of the inner ring 31.

In the axial direction, a front end surface of the steering shaft 10 and a front end surface of the outer pipe 20 are approximately aligned with each other.

The second bearing 40 is press fits to and outwardly fits over the steering shaft 10 at a position slightly rearward from the middle of the steering shaft 10, and press fits and fits into a rear end portion of the outer pipe 20.

In this manner, the first bearing 30 and the second bearing 40 are in press contact with an outer circumferential surface of the steering shaft 10, and are in press contact with an inner circumferential surface of the outer pipe 20. Therefore, when the driver collides with the steering wheel during the secondary collision, the steering shaft 10, the outer pipe 20, the first bearing 30, and the second bearing 40 move forward in an integrated manner against serration coupling, which will be described later, between the steering shaft 10 and an adapter 52.

Input Shaft

The input shaft 51 is a shaft that is rotatably supported via a bearing (not illustrated), coaxially with the steering shaft 10, in the housing 71. The input shaft is a shaft where a steering force of the driver is input.

Specifically, the cylindrical adapter 52 is fixed to a front end of the input shaft 51. A rear side portion 52a of the adapter 52 is put into the steering shaft 10, and is serration-coupled with the steering shaft 10. Furthermore, the steering device 1 has a tilt steering mechanism, and the steering shaft 10 moves back and forth with respect to the adapter 52 when lock is released in the tilt steering mechanism.

The front end of the input shaft 51 is connected to an output shaft via a torsion bar, and the output shaft is connected to a pinion shaft via a universal coupling. A pinion of the pinion shaft is engaged with a rack of a rack shaft, and the rack shaft reciprocates in a vehicle width direction when the pinion shaft rotates so that rudder angles of left and right steering wheels that are connected to the rack shaft via a tie rod change.

Furthermore, a worm wheel is fixed to the output shaft, and a worm that is rotated by an electric motor is engaged with the worm wheel. When the electric motor is driven in response to torque generated by the torsion bar, the driving force is input into the output shaft via the worm and the worm wheel.

Magnet (Torque Sensor)

A torque sensor is a sensor that detects the torque (steering torque) generated by twisting of the torsion bar between the input shaft and the output shaft. The torque sensor includes a magnet 61 that integrally rotates with the input shaft, and a magnetic detection element (not illustrated) that is fixed to the output shaft to detect a change in the magnet flux caused by the twisting of the torsion bar. The magnet 61 is fixed to the input shaft 51 via the cylindrical clip 62.

Figure 1:
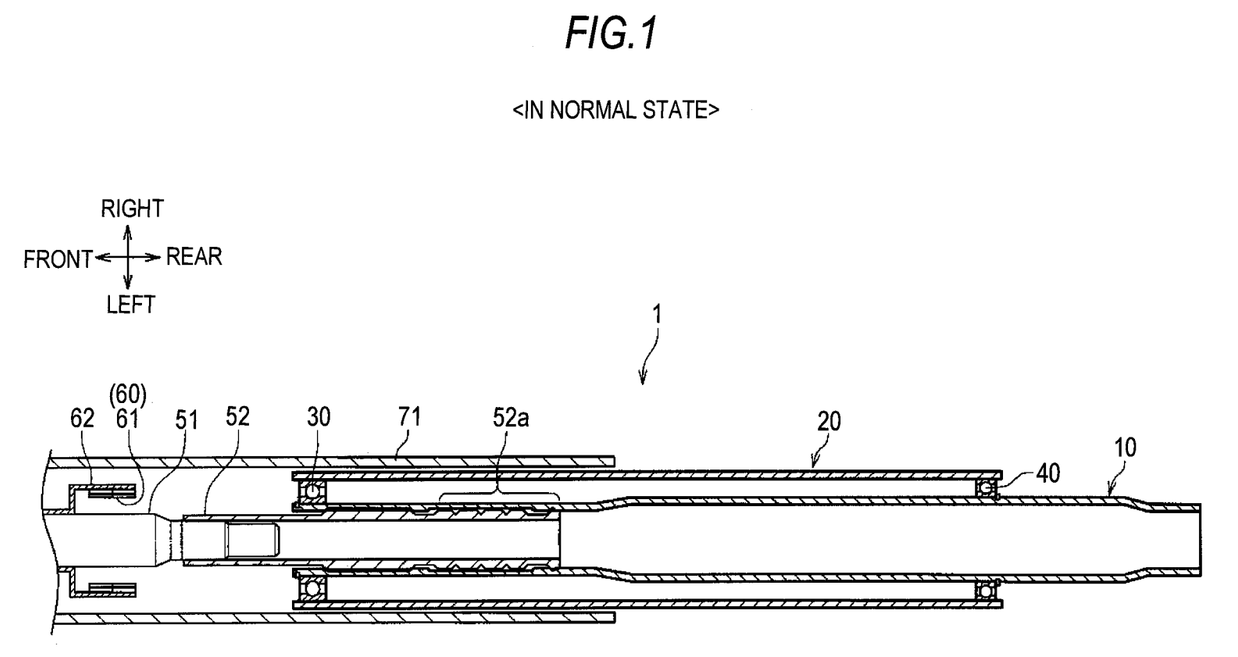
FIG. 1 is a planar cross-sectional view illustrating a steering device according to an embodiment in the normal state.

As illustrated in FIG. 1, herein, the magnet 61 and the clip 62 constitutes a front body that is disposed forward in the axial direction of the first bearing 30. Therefore, when the steering shaft 10, the outer pipe 20, the first bearing 30, and the second bearing 40 move forward in the axial direction in an integrated manner during the secondary collision, the first bearing 30 collides with one or both of the magnet 61 and the clip 62.

First Space of Magnet

When viewed in the axial direction, a ring-shaped first space S1 is formed between the magnet 61 and the input shaft 51 on a radially inner side of the magnet 61. The first space S1 is a space that is formed in front of the steering shaft 10, and into which the steering shaft 10 can be inserted during the secondary collision (refer to FIGS. 3 and 4).

Second Space of Magnet

When viewed in the axial direction, a ring-shaped second space S2 is formed between the clip 62 and the housing 71 on a radially outer side of the magnet 61. The second space S2 is a space that is formed in front of the outer pipe 20, and into which the outer pipe 20 can be inserted during the secondary collision (refer to FIGS. 3 and 4).

Housing

The housing 71 is a cylindrical component that forms a case of the steering device 1.

Operation and Effect of Steering Device

The following operation and effect can be achieved by the steering device 1.

During Secondary Collision

When the secondary collision occurs, that is, when the driver collides with the steering wheel (secondary collision) after a forward collision (primary collision) of a vehicle occurs, the steering wheel, the steering shaft 10, the outer pipe 20, the first bearing 30 and the second bearing 40 move forward in an integrated manner.

Figure 3:
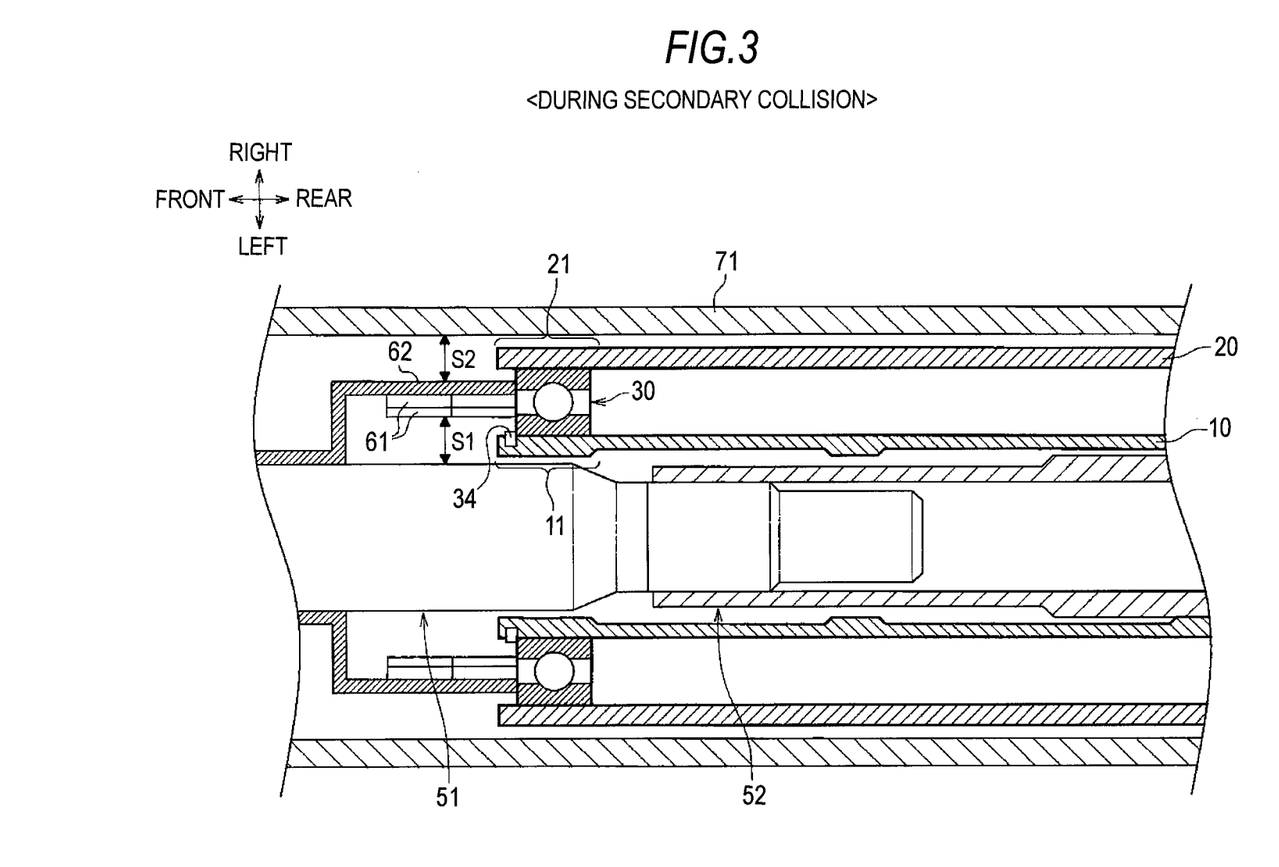
FIG. 3 is an enlarged planar cross-sectional view illustrating the steering device according to the embodiment at the time of a secondary collision (at the time of a collision with a bearing).

As illustrated in FIG. 3, when the first bearing 30 subsequently collides with one or both of the magnet 61 and the clip 62, the impact causes the three split pieces 13 of the steering shaft 10 to bend toward the radially inner side, and causes the three split pieces 23 of the outer pipe 20 to bend toward the radially outer side. In this manner, the relative restraint between the first bearing 30, the steering shaft 10, and the outer pipe 20 in the axial direction is released.

Figure 4:
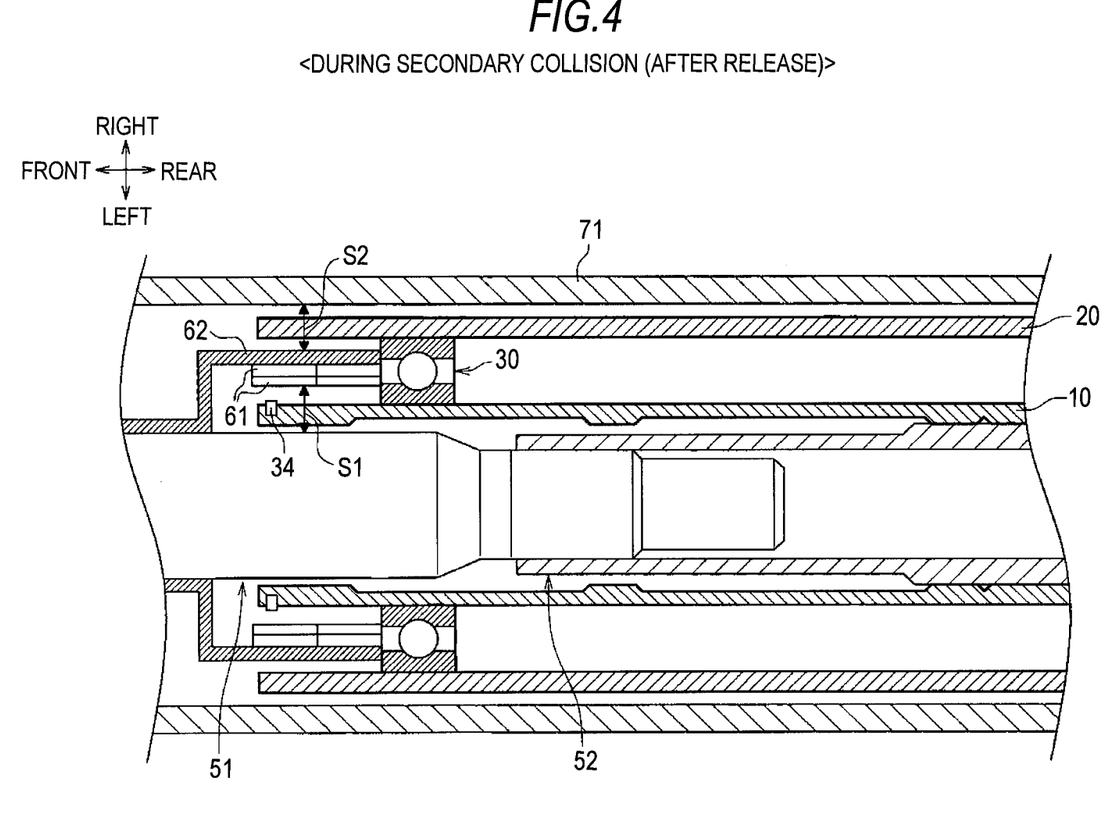
FIG. 4 is an enlarged planar cross-sectional view illustrating the steering device according to the embodiment at the time of the secondary collision (after the collision with the bearing).

Then, the steering shaft 10 moves forward in the first space S1, and the outer pipe 20 moves forward in the second space S2 (refer to FIG. 4). In this manner, the amount of movement (amount of stroke) of the steering shaft 10 and the outer pipe 20 increases.

MODIFICATION EXAMPLE

The embodiment of the present invention has been described hereinabove. However, the present invention is not limited thereto, and may be modified as follows.

Figure 8A:
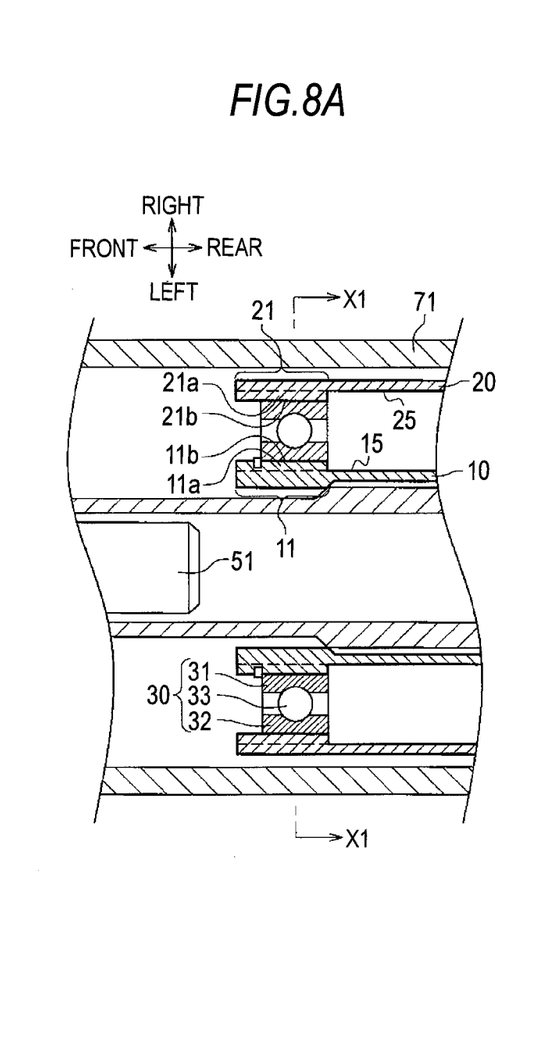
FIG. 8A is a planar cross-sectional view of a steering device according to another modification example.
Figure 8B:
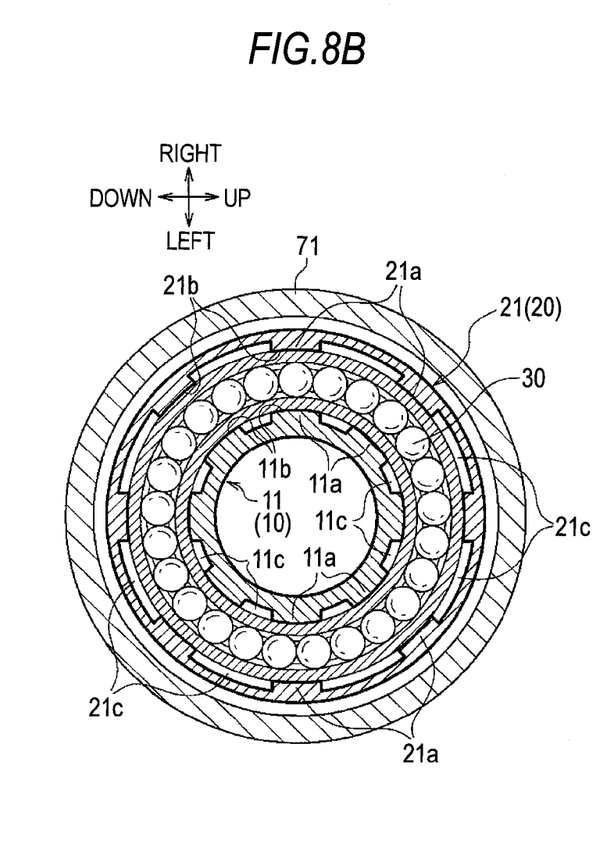
FIG. 8B is a cross-sectional view taken along line X1-X1 of FIG. 8A.

As illustrated in FIGS. 8A and 8B, a plurality of ridges 11a may be formed at regular intervals in a circumferential direction in such a manner as to extend in the axial direction on the outer circumferential surface of the first front end portion 11 of the steering shaft 10, and outer circumferential surfaces 11b (first pressure surfaces) of the plurality of ridges 11a may be in press contact with an inner circumferential surface of the inner ring 31 in the normal state. In other words, in the normal state, the first bearing 30 may be configured to fit over the outer circumferential surfaces 11b of the ridges 11a. The length of the ridge 11a in the axial direction is approximately equal to the length of the first bearing 30 in the axial direction. Grooves 11c that extend in the axial direction are formed between the ridges 11a that are adjacent to each other in the circumferential direction. A small-diameter outer circumferential surface 15 (small-diameter surface) is formed on a rear side of the ridge 11a. In other words, a first stepped surface structure is configured of the outer circumferential surface 11b of the ridge 11a and the outer circumferential surface 15.

Also, a plurality of ridges 21a may be formed at regular intervals in the circumferential direction in such a manner as to extend in the axial direction on the inner circumferential surface of the second front end portion 21 of the outer pipe 20, and inner circumferential surfaces 21b (second pressure surfaces) of the plurality of ridges 21a may be in press contact with an outer circumferential surface of the outer ring 32 in the normal state. In other words, in the normal state, the first bearing 30 may be configured to fit into the inner circumferential surfaces 21b of the ridges 21a. The length of the ridge 21a in the axial direction is approximately equal to the length of the first bearing 30 in the axial direction. Grooves 21c that extend in the axial direction are formed between the ridges 21a that are adjacent to each other in the circumferential direction. A large-diameter inner circumferential surface 25 (large-diameter surface) is formed on a rear side of the ridge 21a. In other words, a second stepped surface structure is configured of the inner circumferential surface 21b of the ridge 21a and the inner circumferential surface 25.

In the case where the first bearing 30 collides with one or both of the magnet 61 and the clip 62 during the secondary collision, the impact causes the first bearing 30 to move to the rear sides of the ridge 11a and the ridge 21a, and the relative restraint between the first bearing 30, the steering shaft 10, and the outer pipe 20 in the axial direction is released.

Figure 9A:
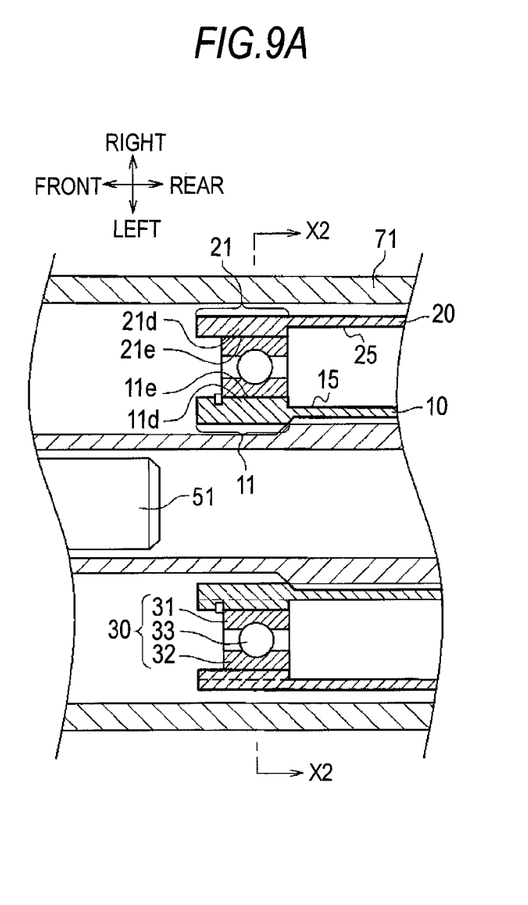
FIG. 9A is a planar cross-sectional view of a steering device according to still another modification example.
Figure 9B:
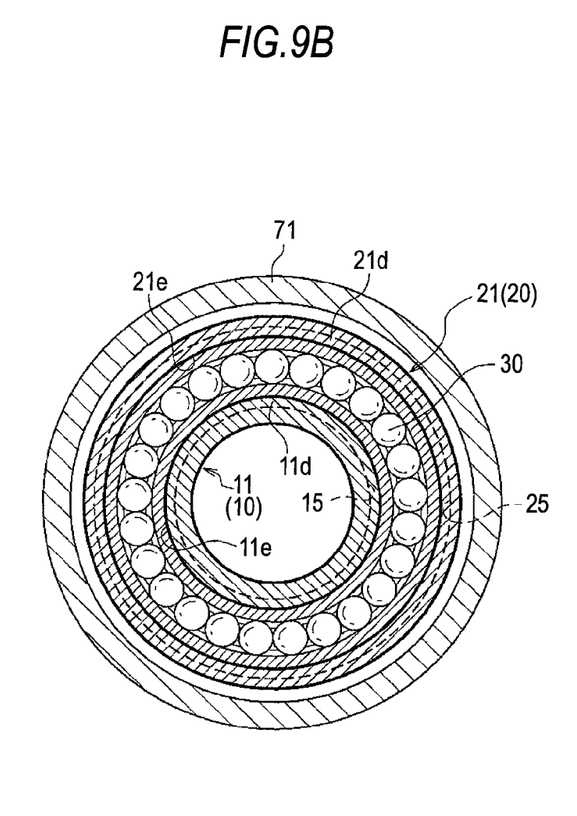
FIG. 9B is a cross-sectional view taken along line X2-X2 of FIG. 9A.

Furthermore, as illustrated in FIGS. 9A and 9B, an annular convex portion 11d may be formed on the outer circumferential surface of the first front end portion 11 of the steering shaft 10, and an outer circumferential surface 11e (first pressure surface) of the convex portion 11d may be in press contact with the inner circumferential surface of the inner ring 31. An annular convex portion 21d may be formed on the inner circumferential surface of the second front end portion 21 of the outer pipe 20, and an inner circumferential surface 21e (first pressure surface) of the convex portion 21d may be in press contact with the outer circumferential surface of the outer ring 32.

In the embodiment described above, the column assist type steering device has been described as an example of the steering device 1. However, the steering device may be, for example, a pinion assist type steering device.

In the embodiment described above, the front body that is disposed forward in the axial direction of the first bearing 30 is the magnet 61 which forms the torque sensor. However, other sensors (components) may be used instead.

What is claimed is:

1. A steering device comprising:
    a tubular steering shaft to which a steering wheel is fixed at a rear end side thereof, and which extends in a front-rear direction;
    a tubular outer pipe disposed coaxially with and on an outer side of the steering shaft;
    a bearing which fits over a first front end portion of the steering shaft, fits into a second front end portion of the outer pipe, and causes the steering shaft to be rotatable with respect to the outer pipe; and
    a front body disposed in front of the bearing in an axial direction,
    wherein the steering shaft, the outer pipe, and the bearing move forward in an integrated manner when a secondary collision occurs,
    a first space into which the steering shaft is capable of being inserted is formed on a radially inner side of the front body,
    a second space into which the outer pipe is capable of being inserted is formed on a radially outer side of the front body, and
    the steering device further comprising a release mechanism which releases a relative restraint between the bearing, the first front end portion, and the second front end portion in the axial direction in a case where the bearing collides with the front body during the secondary collision.

2. The steering device according to claim 1,
    wherein the release mechanism includes a plurality of first slits formed at the first front end portion, arranged in a circumferential direction, and extending in the axial direction, and a plurality of second slits formed at the second front end portion, arranged in the circumferential direction, and extending in the axial direction.

3. The steering device according to claim 1,
    wherein the release mechanism further includes:
        a first stepped surface structure including a first pressure surface of the steering shaft over which the bearing fits and to which the bearing press-contacts in a normal state, and a small-diameter surface formed to have a diameter smaller than a diameter of the first pressure surface on a rear side of the first pressure surface; and
        a second stepped surface structure including a second pressure surface of the outer pipe into which the bearing fits and to which the bearing press-contacts in the normal state, and a large-diameter surface formed to have diameter larger than a diameter of the second pressure surface on a rear side of the second pressure surface.

4. The steering device according to claim 2,
    wherein the release mechanism further includes:
        a first stepped surface structure including a first pressure surface of the steering shaft over which the bearing fits and to which the bearing press-contacts in a normal state, and a small-diameter surface formed to have a diameter smaller than a diameter of the first pressure surface on a rear side of the first pressure surface; and
        a second stepped surface structure including a second pressure surface of the outer pipe into which the bearing fits and to which the bearing press-contacts in the normal state, and a large-diameter surface formed to have diameter larger than a diameter of the second pressure surface on a rear side of the second pressure surface.

* * * * *